US006292656B1

United States Patent
Donovan et al.

(10) Patent No.: US 6,292,656 B1
(45) Date of Patent: Sep. 18, 2001

(54) METHOD OF JETTING UP A CALL USING A WIRELESS PREPAID PLATFORM INTEGRATION WITH SS7 ISUP INTERFACE

(75) Inventors: Steven Donovan; Raghavan Devanathan, both of Plano; Gou-Fuh George Chou, Colleyville; John Kenneth Gallant, Plano, all of TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/935,822

(22) Filed: Sep. 23, 1997

(51) Int. Cl.[7] .......................... H04M 11/00; H04M 17/00; H04Q 7/20; H04J 3/12

(52) U.S. Cl. .......................... 455/406; 370/524; 379/155; 455/433

(58) Field of Search .................... 455/408, 422, 455/433, 406; 379/88.05, 155; 370/524

(56) References Cited

U.S. PATENT DOCUMENTS

| | | | |
|---|---|---|---|
| 4,232,199 | 11/1980 | Boatwright et al. | 179/18 B |
| 4,577,061 | 3/1986 | Katzeff et al. | 179/2 AM |
| 4,611,096 | 9/1986 | Asmuth et al. | 179/18 B |
| 4,625,081 | 11/1986 | Lotito et al. | 379/88 |
| 4,685,127 | 8/1987 | Miller et al. | 379/221 |
| 4,706,275 | 11/1987 | Kamil | 379/144 |
| 4,782,519 | 11/1988 | Patel et al. | 379/221 |
| 4,791,640 | 12/1988 | Sand | 370/58 |
| 4,893,330 | 1/1990 | Franco | 379/91 |
| 5,068,891 | 11/1991 | Marshall | 379/91 |
| 5,195,086 | 3/1993 | Baumgartner et al. | 370/62 |
| 5,222,120 | 6/1993 | McLeod et al. | 379/88 |
| 5,353,335 | * 10/1994 | D'Urso et al. | 379/155 |
| 5,452,350 | 9/1995 | Reynolds et al. | 379/220 |
| 5,590,181 | 12/1996 | Hogan et al. | 379/114 |
| 5,815,810 | * 9/1998 | Gallant et al. | 455/433 |
| 5,889,782 | * 3/1999 | Dendi | 370/524 |
| 6,075,982 | * 6/2000 | Donovan et al. | 455/406 |

FOREIGN PATENT DOCUMENTS

WO 91/16779   10/1991   (WO) .............................. H04M/1/66

OTHER PUBLICATIONS

Weinstein, S., "Smart credit cards: the answer to cashless shopping", *IEEE Spectrum*, Feb. 1984, pp. 43–49.
Joneleit, P. "Signaling System 7 rescues antiquated billing system", *Telephony*, Dec. 2, 1991, pp. 32, 34 and 36.
Gordon et al., "Gazing into the SPC network future reveals vista of new features", *Telephony*, Feb. 21, 1983, pp. 86–93.
"DMS–250 Long Distance Switch Product Information: Product Technical Overview", Northern Telecom, from http://www.nortel.com/broadband/dms/250/250information.html, Copyright 1996.
Briere, D., "The secret to success with virtual nets", *Network World*, vol. 9, No. 12, Mar. 23, 1992, pp. 1, 31 and 41–43.

* cited by examiner

*Primary Examiner*—William Cumming (57) ABSTRACT

Telecommunications networks for originating and terminating calls are described to include a wireless enhanced service platform coupled to a home location register database and a prepaid platform which may also include a mobile switching center for accepting calls from a wireless handset, an interexchange network that carries calls to the prepaid platform, and a local network for terminating calls. Also described is a method for setting up a call in a telecommunications network by a wireless enhanced service platform or mobile switching center encapsulating one or more prepaid call parameters within a super generic digit field of an initial address message. The method also includes sending the initial address message with the prepaid call parameters encapsulated within the super generic digit field from the wireless enhanced service platform or mobile switching center to a prepaid platform.

11 Claims, 6 Drawing Sheets

METHOD OF JETTING UP A CALL USING A WIRELESS PREPAID PLATFORM INTEGRATION WITH SS7 ISUP INTERFACE

CROSS-REFERENCE TO RELATED APPLICATION

The following application of common assignee contains some disclosure, and is believed to have an effective filing date identical with that of the present application.

A WIRELESS PREPAID PLATFORM INTEGRATION WITH STANDARD SIGNALING, U.S. patent application Ser. No. 08/935,821, incorporated herein by reference in its entirety.

BACKGROUND OF THE INVENTION

1. Field of the Invention

The present invention relates generally to telecommunications network products and, more particularly, to a network and method for processing wireless prepaid telephone calls.

2. Related Art

Telecommunications network products are services provided by telephone companies that are carried on telecommunications networks. A widely known example is dial-1 long-distance voice service which allows a customer to dial a 1 plus a ten digit number from his or her home telephone, talk to a party who answers the telephone on the line of the ten digit number dialed, and pay for the telephone call when billed at the end of the month. Although dial-1 is popular, other calling and payment options are sometimes preferable, such as the option to make a call from a phone other than the home phone and charge the call to the home phone account using a calling card.

One such calling and payment option is debit calling which is also referred to as prepaid calling. Debit calling allows a customer to put funds in an account and have those funds debited each time a telephone call is made. Standard debit call processing includes verification of the account balance prior to connecting the call and ongoing balance verification during the call. An example of a typical debit calling customer is a parent who purchases a debit calling card for a child away from home.

As previously mentioned, debit calling is carried on a telecommunications network. A telecommunications network comprises two basic elements: telecommunications equipment, which may also be referred to as network components, and links which connect the equipment or components. In a common channel signaling telecommunications network, two types of links connect components, signaling links and traffic links (also known as telephone lines). Signaling links carry signaling information needed to process a call between network components. Traffic links or telephone lines carry information a customer is sending, for example a digitalized signal of a person's voice, between network components. Components of the telecommunications network, specifically switches, establish a traffic link to carry a call by exchanging messages via signaling links. Signaling messages specify tasks to be performed on the traffic links.

Because call handling and information processing for debit calling differs from other voice services, debit calls are handled by specialized components in the telecommunications network. Difficulties arise in setting up calls through network components that are not specialized for handling prepaid calls. These components may handle primarily dial-1 calls or be specialized for another service such as wireless voice service. A particular problem addressed by the present invention is incorporating prepaid calls into a network specialized in handling wireless calls.

The most common approach in incorporating debit calling into a wireless network is to require a specialized wireless handset to force calls through to the network components that can handle the debit calls. Another approach is to require a customer to dial an access number to access the appropriate network components for debit calling. Yet another approach is to limit the services available to a debit caller, for example, some wireless debit services allow customers to make debit calls but do not allow customers to receive debit calls via the wireless network.

SUMMARY OF THE INVENTION

Briefly stated, the present invention offers wireless prepaid calling without the use of a special wireless handset or access number. In addition, the present invention allows a customer to place and receive calls via the wireless network. Also, the present invention offers the specialized call processing for wireless debit calls while complying with the industry signaling standards.

More particularly, the present invention is directed to a wireless prepaid platform using a signaling technique. The signaling technique involves defining special parameters, referred to as prepaid call parameters and a prepaid routing number that handle the specialized call processing and route the calls to the specialized network components needed for debit call processing. In the signaling technique, the prepaid call parameters and prepaid routing number are encapsulated in the call set-up signaling information. In other words, prepaid call parameters and prepaid routing number are stored in fields in the signaling messaging used for call set-up that are not specified by the industry standard signaling method.

The telecommunications industry has developed a standard signaling method which allows telephone companies to communicate over the networks of other companies. The equipment in a telecommunications network complies to the standard so it can receive and respond to signaling messages from other equipment. The current industry standard is American National Standards Institute (ANSI) Signaling System Number 7 (SS7) Integrated Services Digital Network (ISDN) User Part (ISUP) NCT1.113 (1995) document and the American National Standards Institute (ANSI) Signaling System Number 7(SS7) Message Transfer Part (MTP) NCT 1.111 (1992) document, which are incorporated herein by reference in its entirety.

The present invention uses fields in the ANSI SS7 ISUP standard signaling messaging that sets up a call. The signaling messaging used for call set-up is referred to as the initial address message. The present invention places or encapsulates the prepaid call parameters within the super generic digits field of the initial address message. Encapsulation is discussed in further detail in U.S. Pat. No. 5,889,782 entitled, "Encapsulation of Proprietary Protocol Information" incorporated herein by reference in its entirety. The prepaid routing number is stored in the called party number field, another field in the initial address message. Although the present invention redefines fields in the standard signaling message, it has the same signaling format and complies with the standard.

Use of the signaling technique alleviates the need for a special wireless handset or access number to direct the call to the appropriate network components. Also, services are not limited, for example, a prepaid subscriber may both make and receive a call.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
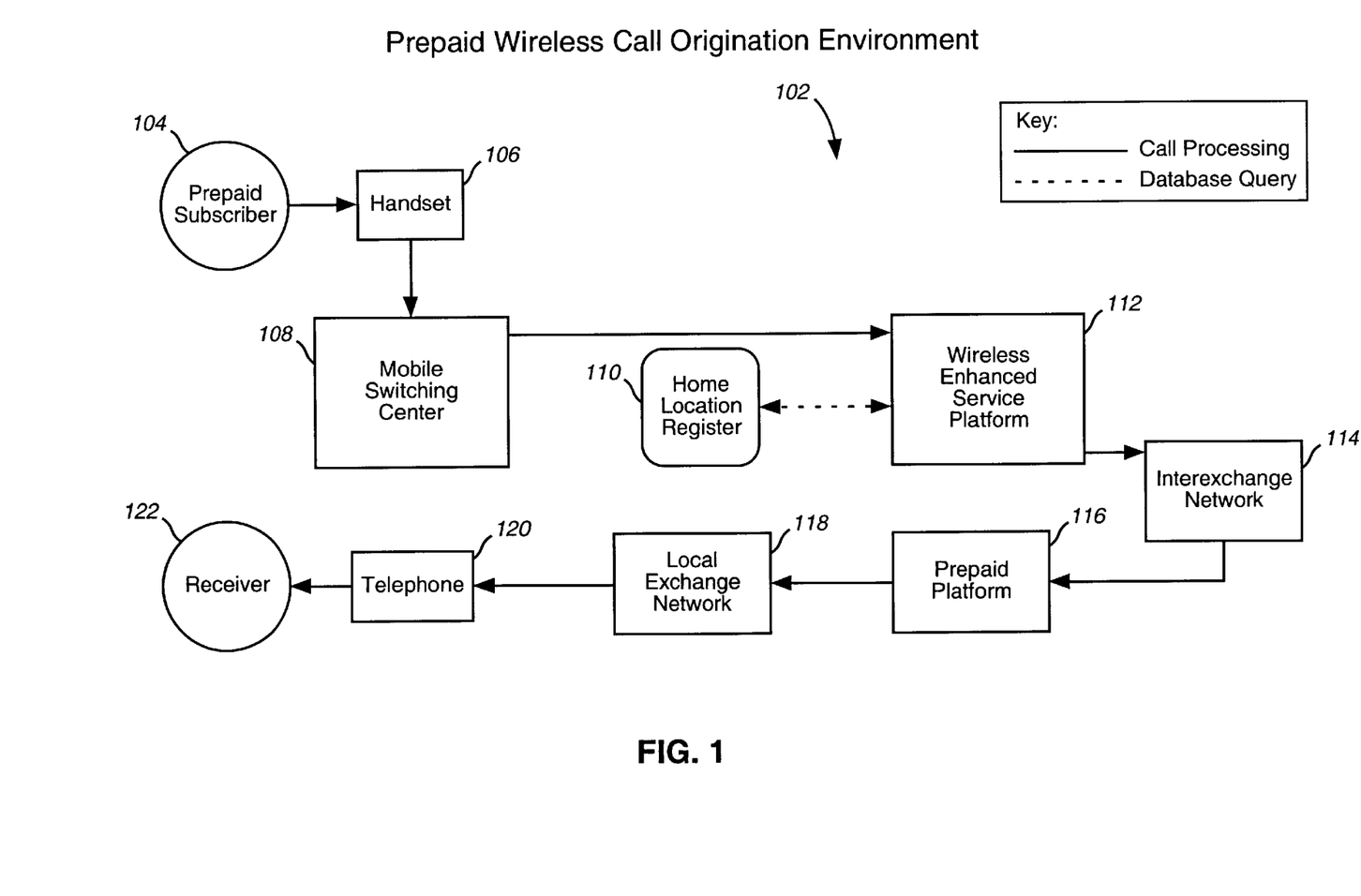
FIG. 1 is a block diagram of a prepaid wireless call origination environment according to a preferred embodiment of the present invention.

FIG. 1 is a block diagram of a debit or prepaid wireless call origination environment 102. The terms debit and prepaid are used synonymously herein. The prepaid wireless call origination environment 102 comprises a wireless enhanced service platform 112, a home location register 110, an interexchange network 114, and a prepaid platform 116.

In an originating wireless debit call, the caller is a wireless debit calling service subscriber 104 (also called a prepaid subscriber). The prepaid subscriber 104 places the call using a wireless handset 106 which is also referred to as a subscriber station, a wireless telephone, or a cellular telephone. When the prepaid subscriber 104 enters calling information (i.e., dials a telephone number) via the wireless handset 106, the wireless handset 106 signals to a mobile switching center 108. The mobile switching center 108 is a switch which routes calls and performs call handling functions. Multiple mobile switching centers 108 are spaced geographically apart. Each mobile switching center 108 has a corresponding database (not shown) containing subscriber information. The mobile switching center 108 accesses the database to gain information about the subscriber 104.

The mobile switching center 108 directs the call to the wireless enhanced service platform 112. The wireless enhanced service platform 112 comprises several components that accept wireless calls, provide audio capability when needed, collect billing information, and route the call through the telecommunications network. The wireless enhanced service platform 112 routes calls by accessing information in the home location register 110. The home location register 110 is a functional database containing subscriber profile and mobility management information. Embodiments of the wireless enhanced service platform 112 and the home location register 110 are described in U.S. patent application Ser. No. 08/495,997 filed on Jun. 28, 1995 for a "Method and Apparatus for Improved Call Connectivity in an Intelligent Wireless Network," which is the parent of Ser. No. 910,148, which issued as U.S. Pat. No. 5,815,810 incorporated herein by reference in its entirety.

Wireless enhanced service platforms 112 typically do not include components that store customer account information to process and bill debit calls. In a network using the present invention, the components of the wireless enhanced service platform 112 need only limited modifications to route to components that store debit customer account information in the prepaid platform 116.

The wireless enhanced service platform 112 routes debit calls to the prepaid platform 116 using an initial address message. As discussed earlier, the initial address message is in the format established by the ANSI SS7 ISUP industry standard signaling method for setting up a call. The initial address message contains a super generic digits field where the wireless enhanced service platform 112 stores the prepaid call parameters. In addition, the initial address message has a called party number field where the prepaid routing number is stored.

The prepaid platform 116 determines whether the subscriber 104 has sufficient funds in his or her account to connect the call. The prepaid platform 116 is made up of several components that have switching, audio, prepaid information processing, and billing capabilities. The prepaid platform 116 uses the prepaid call parameters received from the wireless enhanced service network 112 to process and bill the call.

The calls may be routed to the prepaid platform 116 via an interexchange network 114. An interexchange network 114 comprises a plurality of switches or exchanges that are located throughout a geographic area. For example, a national interexchange network 114 would comprise switches located throughout the nation. When a call is routed to the interexchange network 114, it is routed to one or more switches within the interexchange network 114. The calls are routed via an interexchange network 114 because installing direct signaling links and telephone lines between the wireless enhanced service platform 112 and the prepaid platform 116 is prohibitively expensive. The interexchange network 114 transmits the prepaid call parameters without translation.

The prepaid platform 116 completes the call via a local exchange network 118. A local exchange network 118 comprises switches and termination equipment within a localized area. An example of a local exchange network 118 is a local Bell operating company network such as Bell Atlantic. The local exchange network 118 terminates the call at a telephone 120 which if answered by the receiver 122, completes the call connection.

Figure 2:
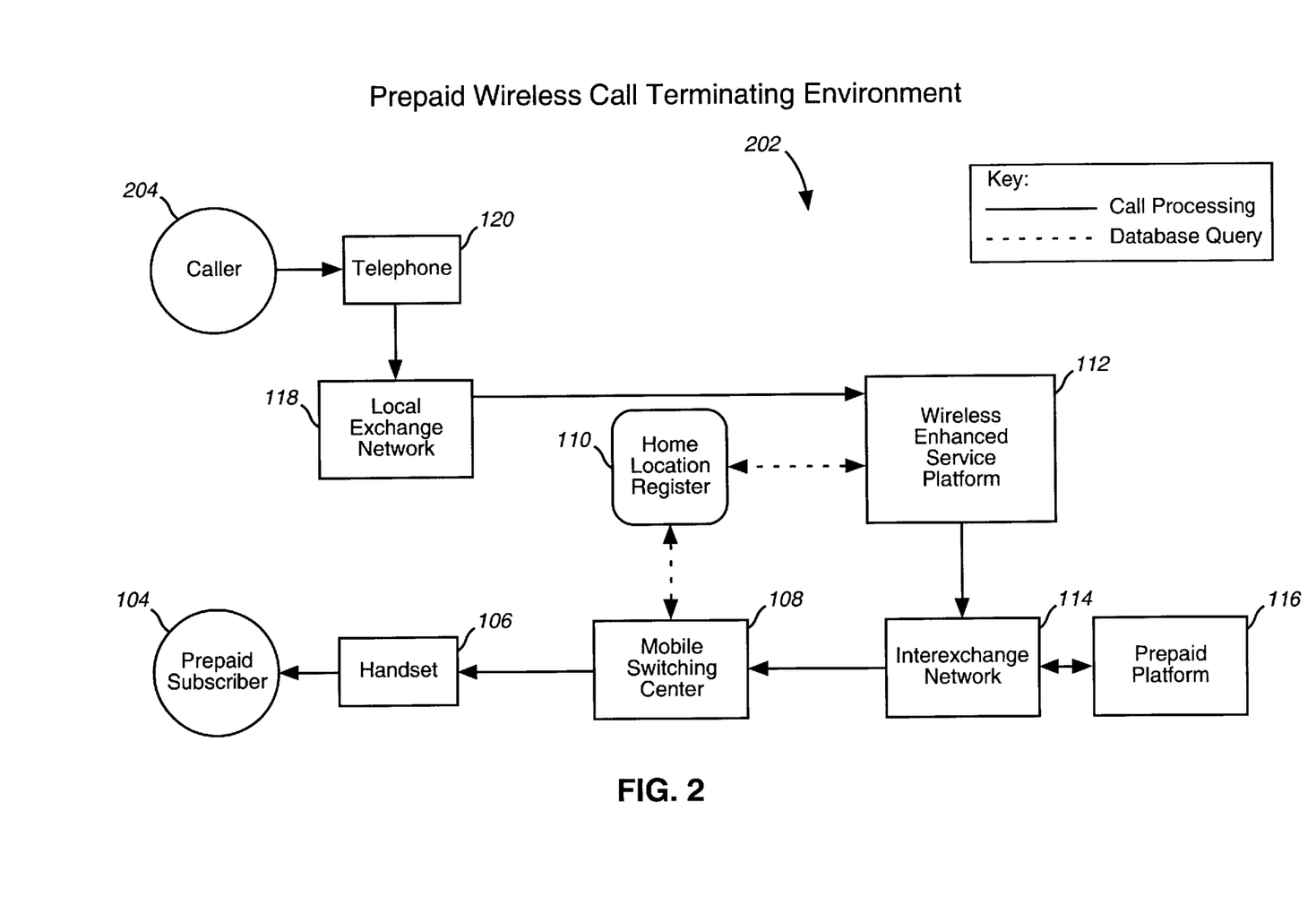
FIG. 2 is a block diagram of the prepaid wireless call termination environment according to a preferred embodiment of the present invention.

FIG. 2 is a block diagram of the prepaid wireless call termination environment 202. The prepaid wireless call termination environment 202 comprises the same network components as the origination environment 102, specifically, a wireless enhanced service platform 112, a home location register 110, an interexchange network 114, and a prepaid platform 116.

In a prepaid wireless terminating call, the called party is a wireless debit calling service subscriber 104. Unlike non-wireless service, a wireless subscriber 104 is billed not only for making a call, but also for receiving a call. The caller 204 may be any telephone service customer, however; in this embodiment the caller 204 uses a non-wireless service.

When the caller 204 enters calling information (i.e., dials a telephone number) via the telephone 120, the telephone 120 signals to the local exchange network 118. Contrary to originating call processing, the local exchange network 118 and not the mobile switching center 108 accepts the call from caller 204 and sets up the call to the wireless enhanced service platform 112.

Nevertheless, the wireless enhanced service platform 112 accepts the call and uses information obtained by querying the home location register 110 to process the call. Similar to originating call processing, the wireless enhanced service platform 112 needs only limited modifications to handle debit calling service. The wireless enhanced service platform 112 routes calls to the prepaid platform 116 via the interexchange network 114 for prepaid call processing. Also, similar to originating call processing, the wireless enhanced service platform 112 routes prepaid call parameters to the prepaid platform in the super generic digits field of the initial address message. In addition, the prepaid routing number is sent to the interexchange network in the called party number field of the initial address message.

Like originating call processing, the prepaid platform 116 can terminate a call to a wireless subscriber 104 via the local exchange network 118 if the local exchange network 118 is capable of handling wireless calls. However, if the local exchange network 118 is not capable of handling wireless calls, the terminating calls are routed from the prepaid platform 116 back to the interexchange network 114, as is shown in FIG. 2. The interexchange network 114 routes the call to the mobile switching center 108 that serves the prepaid subscriber 104.

When the mobile switching center 108 receives the call, the mobile switching center 108 signals to the wireless handset 106 of the prepaid subscriber 104. Like originating call processing, the call connection is complete if the prepaid subscriber 104 answers the call.

Figure 3A:
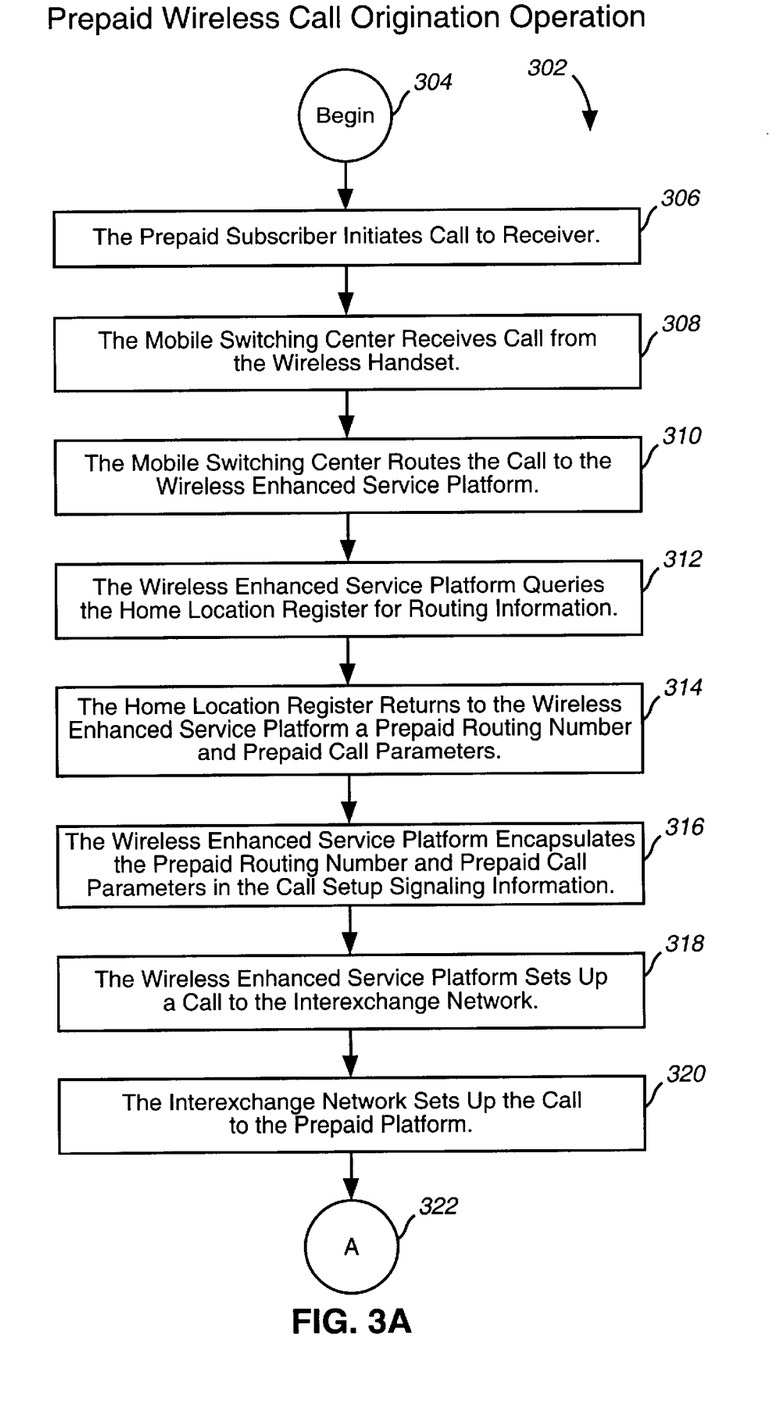
FIGS. 3A and 3B collectively depict a flowchart illustrating the operation of the prepaid wireless call origination environment of FIG. 1 according to a preferred embodiment of the present invention.
Figure 3B:
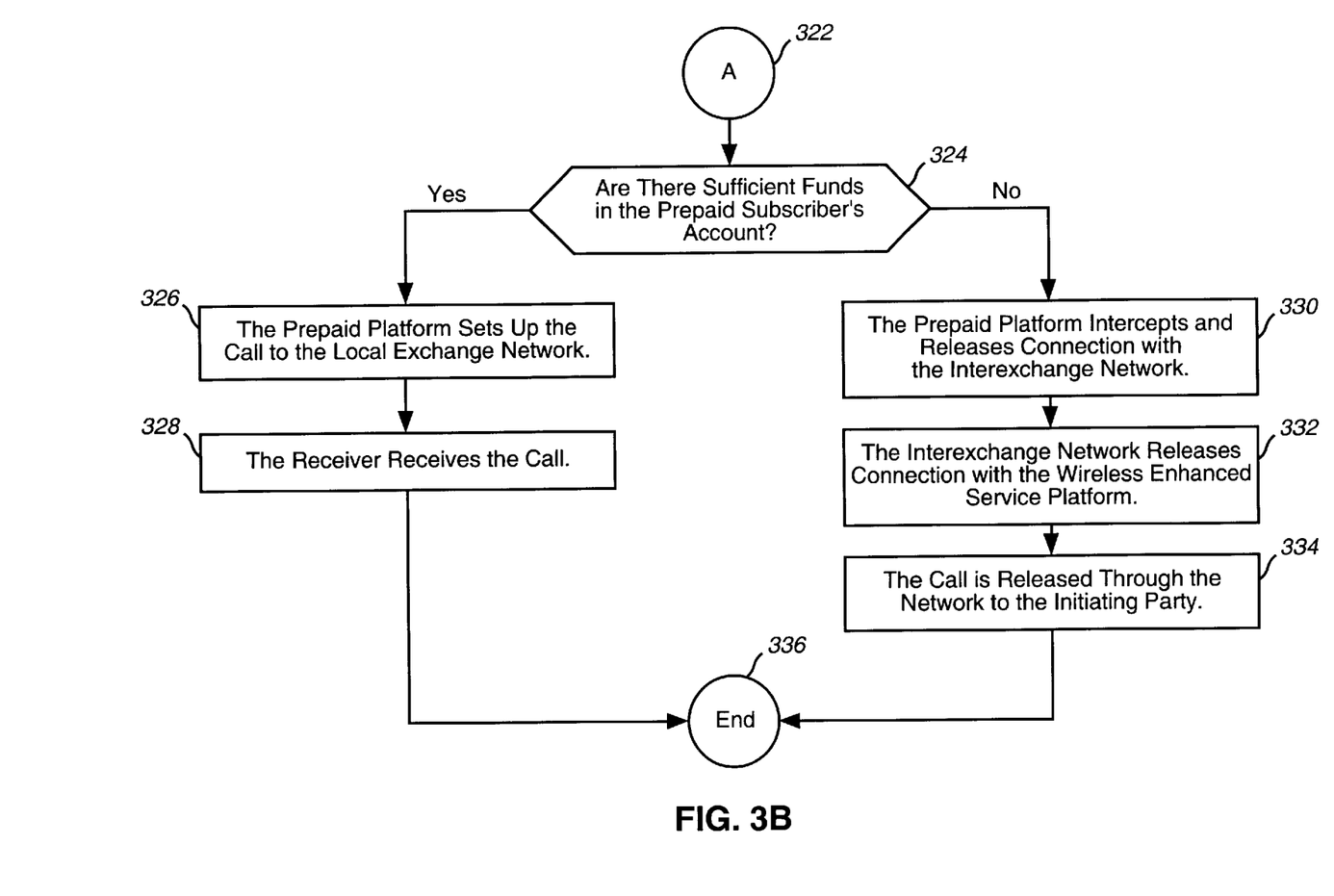

FIGS. 3A and 3B collectively represent a flowchart 302 which illustrates the operation of the prepaid wireless call origination environment 102. When describing the steps of FIGS. 3A and 3B, the components shown in FIG. 1 will be referenced. In step 306, the prepaid subscriber 104 initiates a call to a receiver 122. The prepaid subscriber 104 does this by entering digits of a telephone number in the wireless handset 106.

In step 308, the mobile switching center 108 receives the call. The digits entered into the wireless handset 106 are transferred via a signal to the mobile switching center 108 in a well known manner.

In step 310, the mobile switching center 108 routes the call to the wireless enhanced service platform 112. The mobile switching center 108 sends an origination request to the wireless enhanced service platform 112. The origination request consists of an initial address message. The initial address message is used when a component in a telecommunications network signals to another component to set up a call.

The preferred initial address message contains fields that describe the nature of the connection, the calling party, the called party, and other attributes needed to connect and bill a call. For example, the calling party number and called party number fields give routing and billing information. The charge number field gives billing information. Also included are fields that indicate the attributes of the network the call is being carried on. For example, the nature of the connection indicators inform the receiving equipment whether satellite and echo suppression equipment are being used. A full list of the fields of the initial address message is given below in Table 1.

TABLE 1

Initial Address Message

| Fields | Usage |
| --- | --- |
| Nature of Connection Indicators | Set of indicators regarding the transmission of connectivity. |
| Forward Call Indicator | Set of indicators regarding the connection and type of call. |
| Calling Number Party | Ordinary Calling Subscriber (ISDN) numbering plan. |
| User Service Information | Set of indicators identifying the bearer capability information. |
| Charge Number | Mobile subscriber's billing number, if different from the mobile subscriber's directory number. |
| Calling Party Number | Mobile subscriber's directory number. |
| Called Party Number | Destination address digits. |
| Redirecting Number Parameter | The last forwarding number, if call forwarding has occurred. The presence of this parameter depends on the availability of this information from the originating network. |
| Original Called Number | Original destination address digits dialed, if multiple call forwarding has occurred. The presence of this parameter depends on the availability of this information from the originating network. |
| Originating Line Information | Originating lines ANI information digits. |
| Transit Network Selection | Information regarding transit networks. |
| Generic Address Field | Optional |
| Super Generic Digits Field | Below |
| Network Transport | Optional |

The information in the calling party number field of the initial address message shown in Table 1 above is used to determine the identifier of the originating mobile switching center 108 which is the mobile switching center 108 that received the call from the wireless handset 106. The identifier of the originating mobile switching center 108 is referred to as the originating mobile directory number. The originating mobile directory number is used to determine where the call was placed to bill the call.

In step 312, the wireless enhanced service platform 112 queries the home location register 110 for routing information. The home location register 110 maintains two types of subscriber information: subscription information and location information. Subscription information is the services that the subscriber 104 is authorized to use. The home location register uses the subscription information to verify that the subscriber 104 is authorized for prepaid wireless service. One type of location information is the last mobile switching center 108 that was registered as serving the subscriber 104. The last mobile switching center 108 that was registered as serving the subscriber 104 may be different than the originating mobile switching center 108 if the subscriber 104 is calling from outside his or her home area. The subscriber's mobile switching center 108 is identified using a mobile switching center identification number. The prepaid subscriber 104 is identified using a mobile identification number. Other location information is used to calculate tax on the cost of a call. Location information is used to properly route and bill the call.

In step 314, the home location register 110 returns to the wireless enhanced service platform 112 a prepaid routing number and prepaid call parameters. The prepaid routing number may be a national number, such as the ten-digit number used to route and bill dial-1 calls, or a switch and trunk identifier. Switch and trunk identifiers are used by the switches in telecommunications networks to route calls to another switch via a specified trunk. A trunk is a group of traffic links that have the same physical endpoints and are defined in the switch software to be used as one entity for routing calls.

As mentioned earlier, prepaid call parameters contain information needed to handle the specialized call processing needed for debit calls. The prepaid parameters comprise of location information. More particularly, in this embodiment, two identifiers are returned: a mobile switching center identification number and location identifier for tax calculation. In addition, the wireless enhanced service platform received the origination mobile identification number from the mobile switching center 108.

In step 316, the wireless enhanced service platform 112 encapsulates the prepaid routing number and the prepaid call parameters in the call setup signaling information. As mentioned previously, that is to say the prepaid call parameters are stored in a field in the signaling messaging used for call set-up that is not specified by the industry standard signaling method. Encapsulation is discussed in further detail in the above mentioned U.S. Pat. No. 5,889,782 entitled "Encapsulation of Proprietary Protocol Information."

The prepaid routing number is stored in the called party number field of the initial address message. Destination address digits are typically stored in the address information field of the called party number field shown in Table 2. (The called party number field is part of the initial address message shown in Table 1.) However, in this invention the address information field contains the prepaid routing number. The format of the called party number field is shown below in Table 2.

TABLE 2

Called Party Number Field

| Fields | Usage |
|---|---|
| Nature of Address Indicator | Indicates whether number dialed is a national number, international number, or switch identifier and trunk number. |
| Numbering Plan | Choice of unknown (default) or ISDN (telephony) numbering plan, based on the dialed digits. |
| Address Information | Address digits dialed by the calling party if any. |

The prepaid call parameters are stored in the super generic digits field of the initial address message shown in Table 1. In U.S. Pat. No. 5,889,782 entitled, "Encapsulation of Proprietary Protocol Information," an allocation scheme for the parameters in the super generic digits field was set forth. This embodiment of the present invention has defined parameters based on that allocation. The first two bytes are allocated to storing the parameter name and length. The parameter names in this embodiment are MSCID for the mobile switching center identification number, Location ID for the location identifier for tax calculation, and OMIN for the originating mobile identification number. The parameter length is specified on a case-by-case basis. The third byte is allocated to storing the encoding scheme and type of digits. In this embodiment of the present invention, the encoding scheme is binary and the type of digits are 0x19 (11011) which are generic digits. Table 3 below shows the allocation of bytes and bits in the super generic digits field. The super generic digits field for originating calls is shown in the Table 4 below.

TABLE 3

Format for Super Generic Digits Field

| Bit# | 7 | 6 | 5 | 4 | 3 | 2 | 1 | 0 |
|---|---|---|---|---|---|---|---|---|
| Byte# | | | | | | | | |
| 1 | Parameter Name ||||||||
| 2 | Parameter Length ||||||||
| 3 | Encoding Scheme |||| Type of Digits ||||
| 4 | Digits ||||||||
| : | : ||||||||
| n | Digits ||||||||

TABLE 4

Super Generic Digits Field for Originated Calls

| Fields | Usage |
|---|---|
| Encoding Scheme | Binary |
| Type of Digits | 0x19 (11011) = Generic Digits |
| OMIN | 0xD3 - Originating Mobile Identification Number |
| Length | Parameter length |
| MSCID | Mobile Switching Center (MSC) Identifier (ID) of the serving MSC. This is used to determine the appropriate rating for billing of the call. |
| Location ID | Location information of the subscriber to be used to determine appropriate tax information for billing, if available. |

In step 318, the wireless enhanced service platform 112 sets up a call to the interexchange network 114. The wireless enhanced service platform 112 sends an initial address message to a switch within the interexchange network 114 with the prepaid routing number and prepaid call parameters encapsulated in the message. The switch within the interexchange network 114 may set up the call via other switches within the interexchange network 114 depending on the availability of traffic links.

In step 320, the interexchange network 114 sets up the call to the prepaid platform 116. The interexchange network 114 uses the prepaid routing number to set-up the call to the prepaid platform 116. If the prepaid routing number is a national number, the switch in the interexchange network 114 looks up the number in a table to retrieve from the table the corresponding switch that is on the prepaid platform 116 and trunk group that is used to route calls to that switch in the prepaid platform. The calls are then routed via the retrieved trunk group to the switch in the prepaid platform. If the prepaid routing number is a switch and trunk identifier, the calls are routed over the trunk group to the identified switch. The interexchange network 114 signals using an initial address message with the prepaid parameters encapsulated within the message. The interexchange network 114 passes the prepaid parameters to the prepaid platform 116 without translation.

In step 324, the prepaid platform 116 determines whether the call should be allowed. To do this the prepaid platform 116 determines whether there are sufficient funds in the subscriber's account. The prepaid platform 116 uses the calling number and the mobile switching center identification number to query the subscriber's account to determine if there are sufficient funds to connect the call.

If there are sufficient funds, step 326 is performed. In step 326, the prepaid platform 116 sets up the call to the local exchange network 118.

In step 328, the receiver 122 receives the call via the telephone 120 and the call connection is complete. Operation of flowchart 302 is complete after step 328 is performed, as indicated by step 336.

Referring again to step 324, if the subscriber 104 does not have sufficient funds in his or her account, step 330 is performed. In step 330, the prepaid platform 116 intercepts the call. The prepaid platform 116 provides a message to the prepaid subscriber 104 informing him or her of the lack of funds in the account. Then the prepaid platform 116 releases the connection with the interexchange network 114.

In step 332, the interexchange network 114 releases the connection with the wireless enhanced service platform 112.

In step 334, the call is released through the network to the prepaid subscriber 104. Operation of flowchart 302 is complete after step 334 is performed, as indicated by step 336.

Figure 4A:
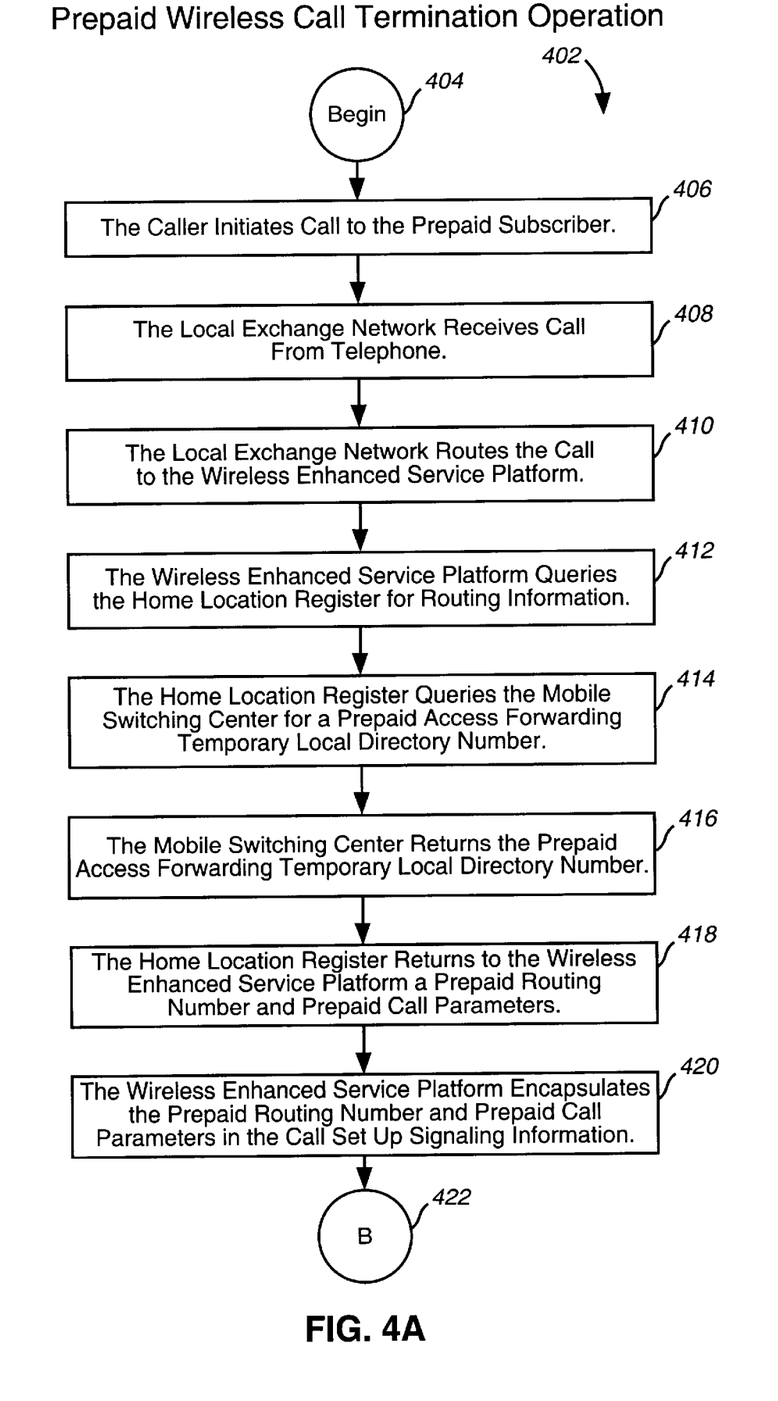
FIGS. 4A and 4B collectively depict a flowchart illustrating the operation of the prepaid wireless call termination environment of FIG. 2 according to a preferred embodiment of the present invention.
Figure 4B:
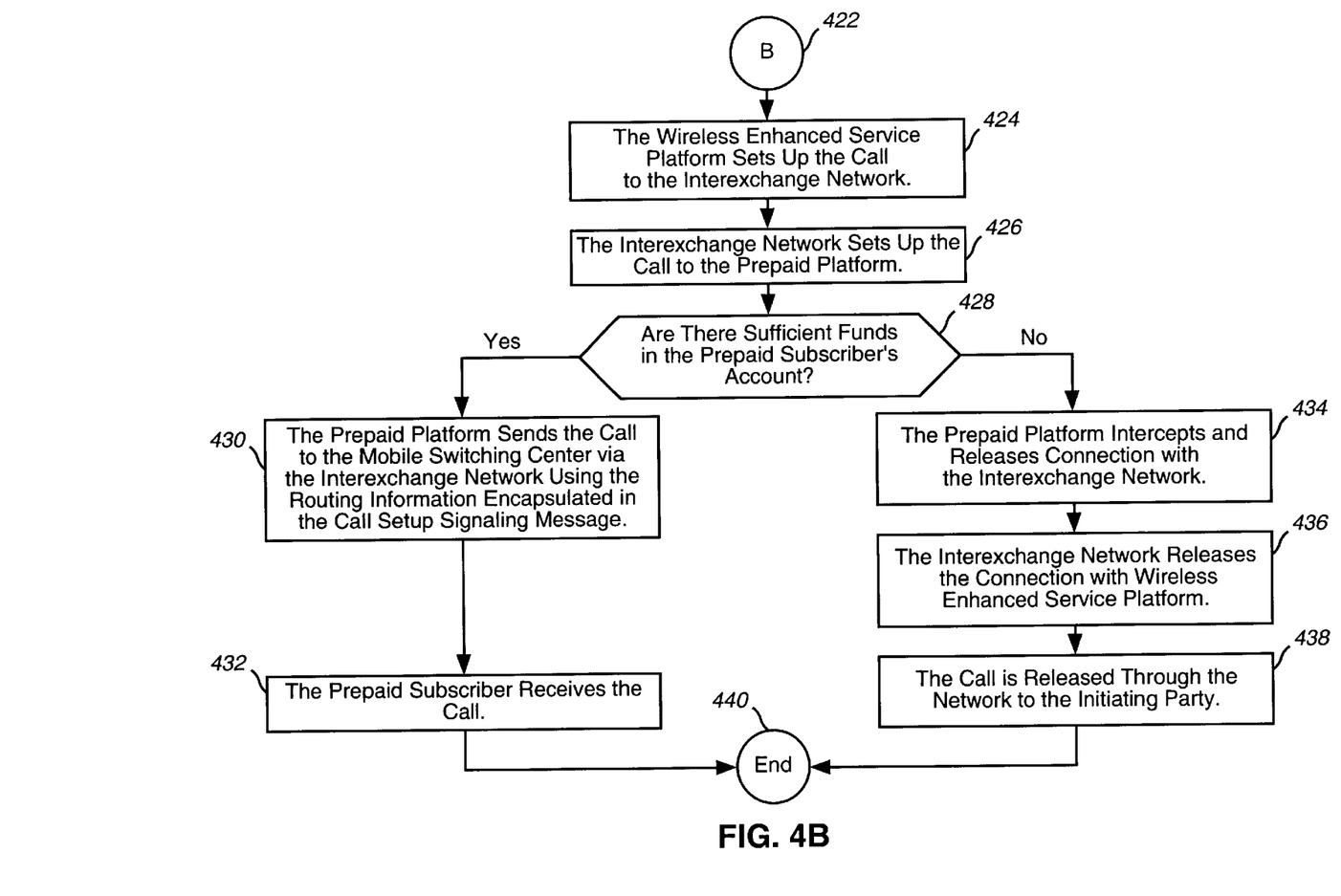

FIGS. 4A and 4B collectively represent flowchart 402 which illustrates the operation of the prepaid wireless call termination environment 202. When describing the steps of FIGS. 4A and 4B, the components shown in FIG. 2 will be referenced. In step 406, the caller 204 initiates a call to the prepaid subscriber 104. The caller 204 initiates the call by entering digits of a telephone number in the telephone 120.

In step 408, the local exchange network 118 receives a call from the telephone 120. The digits entered into the telephone 120 are transferred to the local exchange network 118 in a well known manner.

In step 410, the local exchange network 118 routes the call to the wireless enhanced service platform 112. The local exchange network 118 uses the same signaling as is used for other voice calls.

In step 412, the wireless enhanced service platform 112 queries the home location register 110 for routing information. As previously mentioned, the home location register 110 maintains two types of subscriber information: subscription information and location information. Subscription information is the services that the subscriber 104 is authorized to use. The home location register uses the subscription information to verify that the subscriber 104 is authorized for prepaid wireless service. Location information includes a mobile switching center identification number and a location identifier used to calculate tax on the cost of a call.

In step 414, the home location register 110 queries the mobile switching center 108 for a prepaid access forwarding temporary local directory number. The prepaid access forwarding temporary local directory number is an additional parameter for terminating calls used by the prepaid platform 116 in a later step to route the call to the appropriate mobile switching center 108 for call completion. The prepaid access forwarding temporary local directory number is in the form of destination digits. The prepaid access forwarding temporary local directory number is an additional parameter that is encapsulated in the initial address message. The home location register 110 uses the mobile switching center identification number it has stored which, as mentioned previously, is the last mobile switching center 108 registered as serving the subscriber 104, to determine which mobile switching center 108 to query.

In step 416, the mobile switching center 108 returns the prepaid access forwarding temporary local directory number and a terminating mobile identification number to the home location register 110. The terminating mobile identification number is an identifier for the prepaid subscriber 104 that will receive the call.

In step 418, the home location register 110 returns to the wireless enhanced service platform 112 a prepaid routing number and prepaid call parameters. Similar to prepaid wireless originating calls, the prepaid routing number may be a national number or a switch and trunk identifier. With regards to prepaid call parameters, the two identifiers returned for originating calls, the mobile switching center identification number and the location identifier for tax calculation are also returned for terminating calls. However, as mentioned, unlike prepaid wireless originating calls, in this embodiment the home location register 110 also returns two additional parameters, the prepaid access forwarding temporary local directory number and the terminating mobile identification number.

In step 420, similar to originating calls, the wireless enhanced service platform 112 encapsulates the prepaid routing number and the prepaid call parameters in the call set-up signaling information. The prepaid routing number is stored in the called party number field of the initial address message shown in Tables 1 and 2 which is the same field used in originating calls. In addition, as with originating calls, the prepaid call parameters are encapsulated within the super generic digits field shown in Table 1 and follow the allocation of parameters within the super generic digits field described in U.S. Pat. No. 5,889,782 entitled, "Encapsulation of Proprietary Protocol Information."

More particularly, for this embodiment, the allocation of parameters within the super generic digits field for terminating calls is as follows. The first two bytes are allocated to storing the parameter name and length. The parameter names are MSCID for the mobile switching center identification number, Location ID for the location identifier for tax calculation, PAF_TLDN for the prepaid access forwarding temporary local directory number, and TMIN for terminating mobile identification number. The parameter length is specified on a case-by-case basis. The third byte is allocated to storing the encoding scheme, which is binary, and the type of digits, which is 0x19 (11011) or generic digits. For more information, Table 3 shows the allocation of bytes and bits in the super generic digits field. The super generic digits field for terminating calls is shown in Table 5 below.

TABLE 5

Super Generic Digits Field for Terminated Calls

| Fields | Usage |
| --- | --- |
| Encoding Scheme | Binary |
| Type of Digits | 0x19 (11011) = Generic Digits |
| TMIN | 0xD4 = Terminating Mobile Identification Number |
| Length | Parameter length |
| PAF_TLDN | This is the Prepaid Access Forwarding Temporary Local Directory Number that has been retrieved from the current Serving Mobile Switching Center for the subscriber. The Prepaid Processing Platform will use this TLDN when routing the call to the Serving Mobile Switching Center for completion. The TLDN is in the form of destination digits. |
| MSCID | Mobile Switching Center (MSC) Identified (ID) of the serving MSC. This is used to determine the appropriate rating for billing of the call. |
| Location ID | Location information of the subscriber to be used to determine appropriate tax information for billing, if available. |

In step 424, the wireless enhanced service platform 112 sets up the call to the interexchange network 114. Similar to originating calls, the interexchange network 114 obtains a switch and trunk identifier using the prepaid routing number and sets up the call via the trunk group to the identified switch within the prepaid platform 116. The interexchange network 114 sends an initial address message with the prepaid parameters encapsulated within the message. The interexchange network 114 passes the prepaid parameters to the prepaid platform 116 without translation.

In step 426, the interexchange network 114 sets up the call to the prepaid platform 116.

In step 428, the prepaid platform 116 determines whether the call should be allowed. The prepaid platform 116 determines whether there are sufficient funds in the prepaid subscriber's account. The prepaid platform 116 uses the terminating mobile identification number to query the subscriber's account to determine if there are sufficient funds to connect the call.

If there are sufficient funds, step 430 is performed. In step 430, the prepaid platform 116 sends the call to the mobile switching center 108 via the interexchange network 114 using the routing information received in the encapsulated call set-up signaling message. The prepaid platform 116 routes the call using the prepaid access forwarding temporary local directory number. The prepaid access forwarding temporary local directory number, in the form of destination digits, is used by the switch in the interexchange network 114 to route the call to the appropriate mobile switching center 108. The switch in the interexchange network 114 looks up in a table the switch and trunk identifiers corresponding to the prepaid access forwarding temporary local directory number. The switch and trunk identifiers identify a mobile switching center 108 and a trunk group to the mobile switching center 108. The switch in the interexchange network 114 routes the call to the identified mobile switching center 108 via the retrieved trunk group.

In step 432, the prepaid subscriber 104 receives the call via the telephone 120 and the call connection is complete. Operation of flowchart 402 is complete after step 432 is performed, as indicated by step 440.

If there are not sufficient funds, step 434 is performed. In step 434, the prepaid platform 116 intercepts and releases connection with the interexchange network 114.

In step 436, the interexchange network 114 releases connection with the wireless enhanced service platform 112.

In step 438, the call is released through the network to the caller 204. Operation of flowchart 402 is complete after step 438 is performed, as indicated by step 440.

Other embodiments of the present invention are possible. As mentioned above, another embodiment of the invention allows both the caller 204 and the receiver 104 of FIG. 2 to be wireless subscribers. Also, either or both may be prepaid subscribers. Referring to FIG. 2, this embodiment comprises two handsets 106 rather than a wireless handset 106 and a telephone 120 and two mobile switching centers 108 rather than a mobile switching center 108 and a local exchange network 118.

Further embodiments are possible such as embodiments that replace the wireless handset 106 and/or telephone 120 of FIGS. 1 and 2 with other user interface equipment such as a computer terminal. The user interface equipment may be wireless or non-wireless.

Additional embodiments are possible that access and terminate the call using means other than a single mobile switching center 108 and a single local exchange network 118 shown in FIGS. 1 and 2. These embodiments may include a plurality of either mobile switching centers 108 and/or local exchange networks 118. Other embodiments may use different types of equipment, such as a private branch exchange, to perform the functions of the mobile switching center 108 and/or the local exchange network 118.

A private branch exchange is an exchange that is owned by a private company and is not part of a public network. In another embodiment, the wireless enhanced service platform 112 performs the functions of the mobile switching center 108. Two additional embodiments that are possible comprise direct lines from the user interface equipment into the wireless enhanced service platform 112 or the prepaid platform 116. In these embodiments, the prepaid wireless call environment, including the wireless enhanced service platform 112, home location register 110, interexchange network 114, and the prepaid platform 116, perform the functions of the mobile switching center 108 and the local exchange network 118.

Still more embodiments are possible by reconfiguring the components of the prepaid wireless call environment. For example, referencing FIGS. 1 or 2, an alternative embodiment does not include the interexchange network 114. In FIG. 1, the interexchange network 114 can be omitted by installing lines directly between the wireless enhanced service platform 112 and the prepaid platform 116. In FIG. 2, the interexchange network 114 can be omitted by both installing lines directly between the wireless enhanced service platform 112 and the prepaid platform 116 and installing lines directly from the prepaid platform 116 to the mobile switching center 108 or another piece of equipment performing the mobile switching center's function. Furthermore, the home location register 110 may be omitted and its function may be performed by the wireless enhanced service platform 112. Finally, the wireless enhanced service platform 112 and the prepaid platform 116 may be combined into the same platform or component with the signaling of the present invention occurring between the wireless and prepaid functional environments.

While various embodiments of the present invention have been described above, it should be understood that they have been presented by way of example only, not limitation. Thus, the breadth and scope of the present invention should not be limited by any of the above-described exemplary embodiments, but should be defined only in accordance with the following claims and their equivalents.

What is claimed is:

1. A method for setting up a call in a telecommunications system comprising:

signaling from a telephone to a local network;

signaling from a local network to a wireless enhanced service platform;

sending a query for one or more prepaid call parameters from the wireless enhanced service platform to a home location register;

sending a query for a prepaid access forwarding temporary local directory number from the home location register to a mobile switching center;

sending the prepaid access forwarding temporary local directory number from the mobile switching center to the home location register;

sending prepaid call parameters, including the prepaid access forwarding temporary local directory number, from the home location register to the wireless enhanced service platform;

encapsulating by the wireless enhanced service platform one or more prepaid call parameters relating to a wireless call within a super generic digit field of an initial address message; and sending the initial address message with the prepaid call parameters encapsulated within the super generic digit field of the initial address message from the wireless enhanced service platform to a prepaid platform, the prepaid platform determining whether a subscriber corresponding to the prepaid call parameters has an account with sufficient funds, and when there are not sufficient funds in the account, the prepaid platform initiates releasing of the wireless call, and when there are sufficient funds in the account, the prepaid platform initiates completion of the call.

2. The method of claim 1, wherein the step of sending the initial address message comprises:

(i) encapulsating by the wireless enhanced service platform a prepaid routing number in a called party number field of the initial address message;

(ii) sending the initial address message with the prepaid call parameters and the prepaid routing number encapsulated within from the wireless enhanced service platform to an interexchange network;

(iii) retrieving the prepaid routing number from the called party number field and translating the prepaid routing number in order to route the call to the prepaid platform; and (iv) sending the initial address message with the prepaid call parameters encapsulated within the initial message from the interexchange network to the prepaid platform.

3. The method of claim 1, wherein said prepaid call parameters comprise:

a mobile switching center identification number.

4. The method of claim 1, wherein said prepaid call parameters comprise:

a location identifier for tax calculation.

5. The method of claim 1, wherein said prepaid call parameters comprise:

a prepaid access forwarding temporary local directory number.

6. The method of claim 1, wherein said prepaid routing number comprises:

a national routing number; or a switch identifier and a trunk identifier.

7. The method of claim 1, further comprising the following steps:

signaling from a handset to a mobile switching center; and signaling from a mobile switching center to the wireless enhanced service platform.

8. The method of claim 1, further comprising the following steps:

signaling from the prepaid platform to the local network.

9. The method of claim 1, further comprising the following steps:

sending an initial address from the prepaid platform to an interexchange network;

signaling from the interexchange network to a mobile switching center; and signaling from the mobile switching center to a wireless handset.

10. The method of claim 1, further comprising the following steps:

retrieving information from the subscriber's account within the prepaid platform.

11. A method for setting up a call in a telecommunications system comprising:

signaling from a telephone to a local network;

signaling from a local network to a mobile switching center;

sending a query for one or more prepaid call parameters from the mobile switching center to a home location register;

sending a query for a prepaid access forwarding temporary local directory numbers from the home location register to a mobile switching center;

sending the prepaid parameters from the home location register to the mobile switching center;

encapsulating by a mobile switching center one or more prepaid call parameters relating to a wireless call within a super generic digit field of an initial address message; and sending the initial address message with the prepaid call parameters encapsulated within the super generic digit field of the initial address message from the mobile switching center to a prepaid platform, the prepaid platform determining whether a subscriber corresponding to the prepaid call parameters has an account with sufficient funds, and when there are not sufficient funds in the account, the prepaid platform initiates releasing of the wireless call, and when there are sufficient funds in the account, the prepaid platform initiates completion of the call.

* * * * *